United States Patent [19]

Peachee, Jr.

[11] Patent Number: 4,590,668

[45] Date of Patent: May 27, 1986

[54] METHOD OF AND APPARATUS FOR ASSEMBLING DYNAMOELECTRIC MACHINE

[75] Inventor: C. Theodore Peachee, Jr., St. Louis County, Mo.

[73] Assignee: Emerson Electric Co., St. Louis, Mo.

[21] Appl. No.: 738,254

[22] Filed: May 28, 1985

[51] Int. Cl.⁴ .......................................... H02K 15/16
[52] U.S. Cl. ........................................ 29/596; 72/56
[58] Field of Search ................. 72/56; 29/596, 597, 29/598

[56] References Cited

U.S. PATENT DOCUMENTS

| | | | |
|---|---|---|---|
| 3,398,306 | 8/1968 | Merrick et al. | 310/258 |
| 3,419,957 | 1/1969 | Stone | 29/596 |
| 3,508,327 | 4/1970 | Diederichs et al. | 29/596 |
| 3,575,562 | 4/1971 | Remke | 200/80 |
| 4,209,722 | 6/1980 | Peachee | 310/90 |

OTHER PUBLICATIONS

Tool and Manufacturing Engineer's Handbook, Society of Manufacturing Engineers, Third Edition, ©1976 pp. 17-22-17-30.

Primary Examiner—Howard N. Goldberg
Assistant Examiner—Leonard S. Selman
Attorney, Agent, or Firm—Polster, Polster and Lucchesi

[57] ABSTRACT

A method of assembling a dynamoelectric machine (an electric motor) is disclosed in which a rotor tool is inserted into the stator bore with the tool having an outer diameter substantially equal to or slightly less than the minimum allowable inner diameter of the stator bore. The tool further has a central pin which is inserted into the bearing bore of the motor bearing support or end shield. Portions of the end shield are disposed on the outside of the stator core when the end shield and the stator core are in their desired assembled positions. Then, these portions of the end shield are magnetically deformed inwardly, as by magnetic pulse forming or the like, for positively securing the end shield to the stator core such that the rotor tool maintains alignment of the bearing bore with respect to the stator bore. The rotor tool is removed, and the rotor is inserted in the stator core and in the bearing bore of the end shield such that an air gap of predetermined uniform thickness is established and maintained between the rotor body and the stator core.

Apparatus for carrying out the above-described method is also disclosed.

6 Claims, 4 Drawing Figures

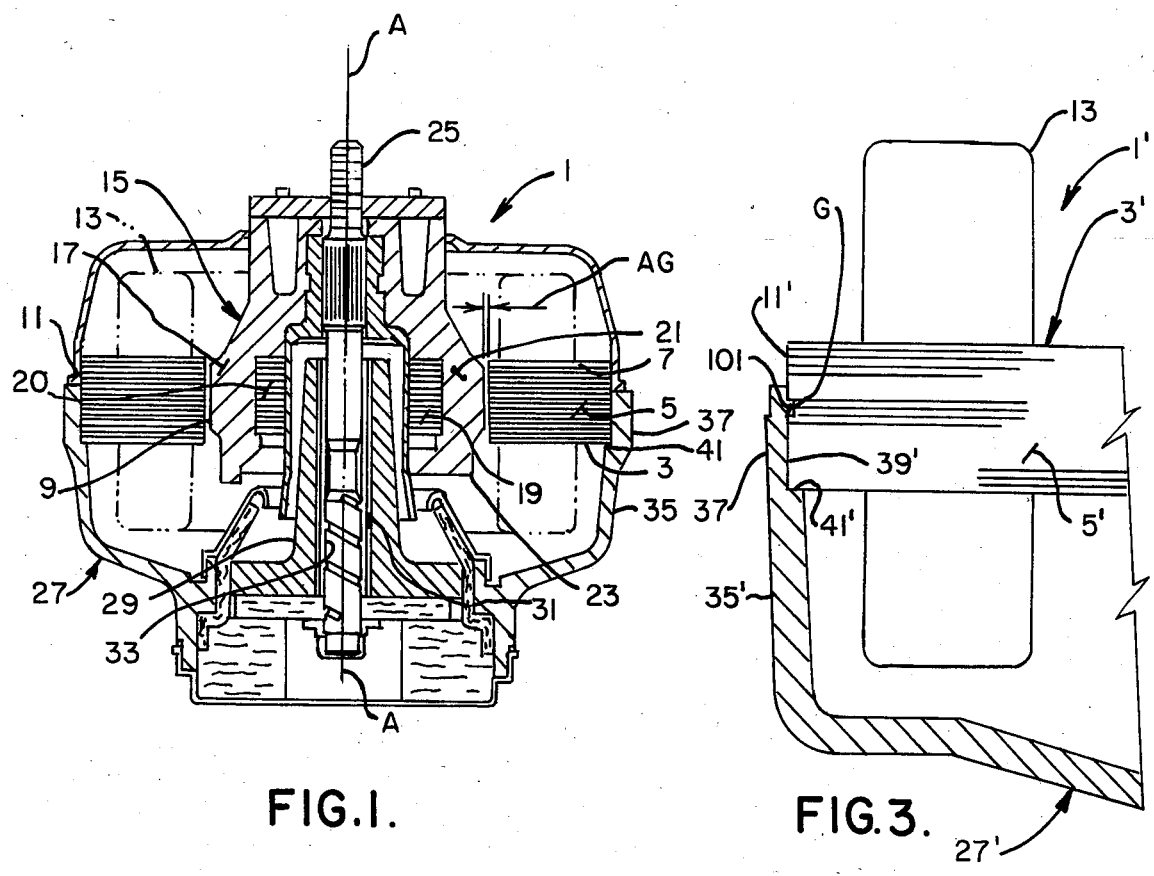
FIG. 1.
FIG. 3.
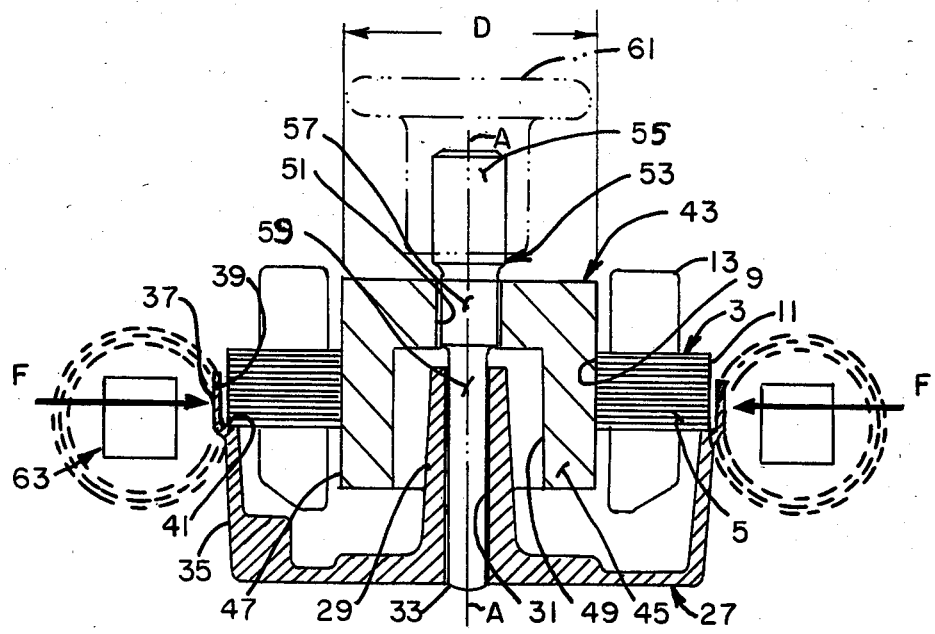
FIG. 2.

METHOD OF AND APPARATUS FOR ASSEMBLING DYNAMOELECTRIC MACHINE

BACKGROUND OF THE INVENTION

This invention relates to a method of and apparatus for assembling a dynamoelectric machine, and more particularly to such method and apparatus in which the end shield or bearing support of an electric motor is secured to the stator core by a magnetic forming technique in such manner so as to establish a uniform air gap between the rotor body and the stator core.

Generally, an electric motor includes a stator comprising a core which is made up of a stack of laminations of suitable ferromagnetic sheet material. Each of the laminations is typically punched to have a central opening and a number of slots extending radially out from the central opening. The laminations are assembled in a stack, with the central openings of the laminations being coaxial so as to form a central bore through the stator core, and with the radial slots being in register with one another so as to form elongate slots extending through the core. Windings of suitable coils of magnet wire are inserted in the slots so as to constitute the windings of the motor. A rotor assembly, typically of squirrel cage construction, is received within the stator bore and is rotatable upon energization of the windings. The rotor assembly includes a rotor body made up of a stack of laminations of ferromagnetic material having longitudinal slots extending therethrough, generally proximate the outer periphery of the rotor body. Conductor bars extending through these longitudinal slots, and end rings interconnecting the ends of the conductor bars on the outside face of the rotor body are typically die cast-in-place on the rotor body. A rotor shaft is affixed to the rotor body such that the rotor body and shaft rotate as a unit. The rotor shaft is journaled in a suitable bearing which in turn is carried by an end shield or bearing support. The end shield may be of cast aluminum or the like, and is secured to the stator core in such manner that the bearing bore of the end shield is concentric or coaxial with respect to the centerline of the stator bore. In this manner, an air gap with a predetermined range of tolerances is provided between the outer surface of the rotor body and the inner portions of the stator core defining the stator bore.

The magnitude and efficiency with which a motor operates is dependent, to a large degree, on the air gap that is present between the outer surface of the rotor body and the inner surfaces of the stator core defining the stator bore. Generally, this air gap must be sufficient so as to prevent the rotor from physically touching the stator. Rotor strike will often lead to the failure of the motor. On the other hand, since the current induced within the rotor by the stator is inversely proportional to the distance from the stator core, a small, uniform air gap is desirable so as to maximize the operating efficiency of the motor.

Heretofore, in the assembly of electric motors and other dynamoelectric machines, a variety of techniques were utilized to align the rotor body with respect to the stator core so as to ensure a uniform air gap of minimum predetermined thickness. Typically, these motor assembly methods utilized shims which were placed between the outer surface of the rotor body and the stator core. These shims maintained the desired air gap while the end shield was affixed to the stator core. The shims were then removed. However, this oftentimes required precise machining of the portions of the end shield which engaged and which were secured to the stator and required that the end shield be adjustably moved relative to the stator to assume its proper position such that the rotor body would be journaled within the stator core within a desired degree of concentricity while maintaining the desired uniform air gap. The techniques were previously utilized to secure the end shield to the stator core in its desired position included the use of fasteners which could be secured after the desired position was attained, the use of adhesives to bond the end shield to the stator core, and the use of various magnetic forming techniques to clamp the end shield to the stator core by means of a separate clamping ring or the like.

This particular invention has reference to a so-called unit bearing motor, such as is described in detail in the co-assigned U.S. Pat. No. 4,209,722, to C. Theodore Peachee, Jr. This last-noted U.S. patent is herein incorporated by reference. In a unit bearing motor, typically only one end shield is provided which journals the rotor shaft, with the end shield being secured to the stator core. In this manner, the rotor is cantilever supported from the end shield bearing support. Of course, in other motor applications, two end shields are typically provided and both ends of the bearing are journaled. As shown in the above-noted U.S. Pat. No. 4,209,722, the end shield or bearing support has an inner surface thereon which is adapted to engage the outer surface and at least a portion of the outer periphery of one end face of the stator core. These surfaces of the end shield were typically machined to an accurate size so as to receive their respective portions of the stator core. The end shield may be secured to the stator core by means of a suitable adhesive or the like. However, this method required that the outside dimensions of the stator core be held within predetermined tolerances, and also required the machining of the inside surfaces of the outer portion of the end shield so as to ensure that the rotor journaled within the end shield was concentric within the stator bore.

As mentioned above, it is known that the bearing support or end shield of an electric motor may be secured to the stator core by assembling the several parts of the motor and placing them within a magnetic coil. Spacers were typically fitted between the stator and the rotor to assure uniformity of the air gap. After the parts were so asssembled and shimmed, a clamping ring surrounding the outer portions of the end shields and the stator core was swaged into place by the instantaneous energization of the magnetic coil which applied extreme compressive or swaging loads to the clamping ring which positively and instantaneously clamped the ends of the end shields to the outer surfaces of the stator. The primary advantage of such magnetic forming techniques in the manufacture of electric motors was that the use of axial tie bolts for securing the end shields to the stator core were eliminated which required precise concentricity between both the stator parts and the end shields. Also, the magnetic forming techniques enjoyed certain advantages over bonding the end shields to the stator core by fast-setting synthetic resins because split-second magnetic forming techniques were substantially faster. A discussion of magnetic pulse forming and, more particularly, the assembly of electric motors can be had by referring to the *Tool And Manufacturing Engineer's Handbook,* published by the Society of Mechanical Engineers, Third Edition, Copyright 1976, pages 17-22 through 17-30.

Other examples of the magnetic forming of the various parts of electric motors can be had by referring to U.S. Pat. Nos. 3,398,306 and 3,419,957, both of which disclose the use of a separate clamping ring which is magnetically formed around the outer surfaces of the stator and end shield to hold the end shield in position on the stator. U.S. Pat. No. 3,508,327 discloses an electric motor in which a conductive cylindrical outer housing is magnetically swaged onto the outer surface of the stator core in such manner as to form inwardly projecting indentations proximate the end faces of the stator core so as to lock the housing in place with respect to the stator core. U.S. Pat. No. 3,575,562 also, apparently, discloses a clamping ring which is magnetically formed to hold the end portions of the end shields of a motor on the stator core.

However, in spite of all of the known prior art methods and techniques of assembling electric motors, including the heretofore known magnetic pulse-forming techniques, it was still a problem as to how to provide accurate and consistent air gaps between the rotor body and the stator while the end shields were secured in place. Typically, most manufacturing techniques required the use of either very accurately machined parts so as to ensure concentricity, or the use of removable shims placed between the rotor body and the stator bore. Of course, the requirement of accurately machining increased the cost of the motor. The requirement of removable shims added complexity and time to the fabrication process.

SUMMARY OF THE INVENTION

Among the several objects and features of the present invention may be noted the provision of a method of and apparatus for assembling a dynamoelectric machine (i.e., an electric motor) which utilizes magnetic pulse-forming techniques, but which eliminates the need of both a separate clamping ring and of shims for establishing and maintaining the air gap during assembly and fabrication;

The provision of such a method and apparatus which eliminates problems of concentricity of the bearing bore of the end shield, and the fit of the end shield on the stator core;

The provision of such a method and apparatus in which the concentricity of the stator core is maintained after mold-on ground insulation has been applied;

The provision of such a method and apparatus which eliminates the necessity of press-fitting the stator into the end shield;

The provision of such method and apparatus which substantially eliminates the rotor from striking the stator core after final assembly;

The provision of such a method and apparatus which tends to automatically align the bearing bore of the end shield relative to the stator core during magnetic forming of the end shield onto the stator core;

The provision of such a method and apparatus which positively interlocks the end shield to the stator core so as to accommodate operation of the motor at elevated temperature levels without loosening of the end shield relative to the stator core, due to differences in the coefficient of thermal expansion between the aluminum end shield and the ferromagnetic material of the stator core;

The provision of such a method and apparatus which eliminates the necessity of accurately machining the outside diameter of the stator, and of machining the inside diameter of the end shield which fits onto the stator core; and The provision of such a method and apparatus which reduces production line rejection, which improves uniformity of the air gap, which reduces the cost and improves the quality of dynamoelectric machines so manufactured.

Other objects and features of this invention will be in part apparent and in part pointed out hereinafter.

Briefly stated, the method of this invention relates to assembling a dynamoelectric machine (e.g., an electric motor). Typically, such a dynamoelectric machine comprises a stator including a core constituted by a stack of laminations of suitable ferromagnetic material. The core has an outer surface and a central bore extending therethrough. A rotor, including a rotor body and a shaft coaxial with the rotor body and extending out beyond the rotor body, is also provided. The rotor body is sized so as to fit closely within the stator bore, but to be free so as to be rotatable within the rotor bore with a substantially uniform air gap of predetermined thickness between the inner surfaces of the stator core defining the bore and the rotor body. The stator bore has a predetermined minimum diameter. At least one bearing support or end shield is provided having bearing means therein for receiving and journaling the rotor shaft. The bearing means has a bearing bore. The bearing support is engageable with the stator core such that the stator bore, the rotor body, the rotor shaft, and the bearing bore of the end shield are substantially coaxial. Specifically, the method of this invention involves the steps of inserting a rotor tool into the stator bore. This rotor tool has a tool body having an outer cylindric diameter substantially equal to or slightly less than the above-noted minimum diameter of the stator bore. The tool also has a central pin. The central pin is inserted into the bearing bore of the bearing support, with the bearing support having portions disposed on the outside of the stator core when the bearing support and the stator core are in their approximate assembled positions relative to one another. With the tool body received within the stator bore, and with the central pin received within the bearing bore of the bearing support, the portions of the bearing support disposed on the outside of the stator core are magnetically deformed inwardly such that the bearing support is positively secured to the stator core, and such that the bearing bore and the stator bore are substantially coaxial.

The apparatus for carrying out the above-described assembly method of a dynamoelectric machine includes a rotor body tool having an outside diameter substantially equal to or slightly less than the above-noted predetermined minimum internal diameter of the stator bore. The rotor body tool is positioned within the stator bore, and a central pin is provided coaxial with respect to the rotor body tool, with this pin being received within the bearing bore of the bearing support. Further, means is provided for magnetically forming the portions of the bearing support inwardly onto the outer surfaces of the stator core, with the rotor tool being received within the stator bore, and with the central pin being received within the bearing bore such that after forming the portions of the bearing support on the stator core, and with the rotor assembly received within the stator core and with the rotor shaft received within the bearing bore, a substantially uniform air gap of predetermined thickness is present between the rotor body and the portions of the stator core defining the stator bore.

BRIEF DECRIPTION OF THE DRAWINGS

FIG. 1 is a longitudinal cross section of a dynamoelectric machine and more particularly, a so-called unit bearing motor, fabricated in accordance with the method of this invention using the apparatus of the present invention;

FIG. 2 is a longitudinal cross section of the stator assembly and of the rotor assembly of the motor shown in FIG. 1, installed in and utilizing the apparatus of the present invention for carrying out the method of assembling the motor in accordance with the present invention;

Figure 4:
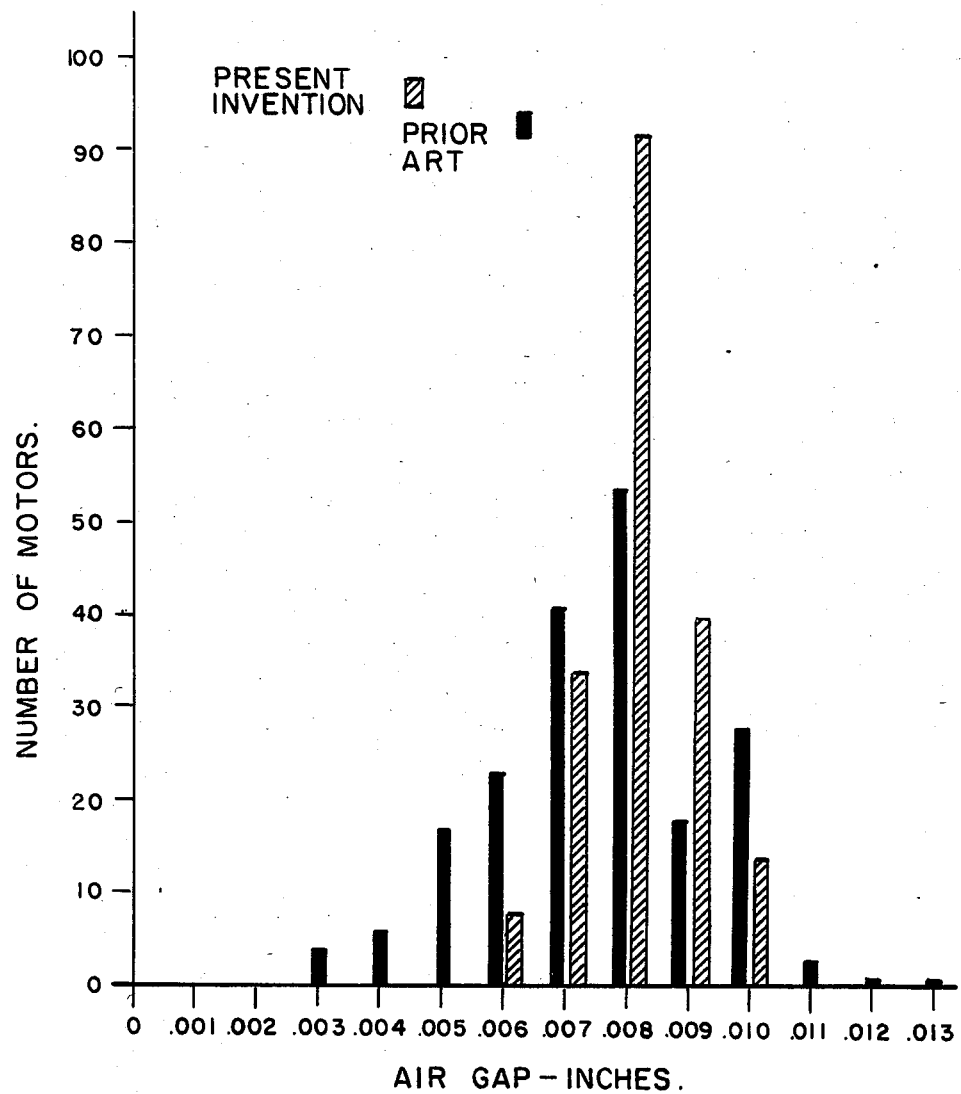

FIG. 3 is an enlarged portion of one edge of the stator assembly and the motor end shield, illustrating the end portion of the end shield overlying the outer surface of the stator core after the outer flange of the end shield has been magnetically formed to the shape of the stator core with a portion of the end shield flange being mechanically interlocked with a groove provided in the outer surface of the stator core; and FIG. 4 is a histogram of the air gap of motors made in accordance with the present invention, as compared with the air gaps of motors made in accordance with the prior art.

Corresponding reference characters indicate corresponding parts throughout the several views of the drawings.

DESCRIPTION OF PREFERRED EMBODIMENTS

Referring now to the drawings, and more particularly to FIG. 1, a dynamoelectric machine is indicated in its entirety by reference character 1. More specifically, dynamoelectric machine 1 is shown to comprise a so-called unit bearing motor. This unit bearing motor comprises a stator, as indicated at 3, having a core 5 made of a plurality or a stack of laminations 7 of a suitable ferromagnetic sheet material. Each of the laminations 7 is punched so as to have a center opening and a number of slots extending radially outwardly from the center opening. When the laminations are arranged in a stack so as to form core 5, the center openings in the laminations form a central stator bore 9. The slots of the laminations are arranged generally in register with one another, and thus form slots (not shown) extending through the core 5. A plurality of coils of suitable magnet wire or the like are inserted in these slots, and thus the coils of wire constitute the windings 13 (shown in phantom) of the motor.

Further, motor 1 includes a rotor, as generally indicated at 15. The rotor includes a rotor body 17 made up of a rotor core 19 which is formed of a plurality of rotor laminations 20. The rotor laminations have a central opening therethrough and a plurality of holes proximate the outer perimeter of the core laminations. As is typical, the rotor core is placed in a suitable die casting machine or the like, and conductor bars 21 and end rings 23 are die cast-in-place on the rotor core so as to constitute a rotor body 17 of squirrel cage construction. A rotor shaft 25 is press-fit into rotor body 17. As shown, rotor shaft 25 extends endwise from rotor body 17.

Motor 1 further includes a bearing support or end shield, as generally indicated at 27. End shield 27 includes an elongate bearing hub 29 having a sleeve bearing 31 inserted therein, with the sleeve bearing having a bearing bore 33. End shield 27 further includes a so-called bell end 35. The bell end terminates in an end flange 37. As indicated at 39, the inner surface of the end flange 37 is initially spaced outwardly from outer surface 11 of core 5, as shown in FIG. 2. An inner shoulder 41 is provided at the outer end of inner flange surface 39 (i.e., toward bearing hub 29) so as to serve as a stop when engagement with the end face of core 5.

When stator 3, rotor 15, and end shield 27 are assembled in their configuration, as generally shown in FIG. 1, the rotor shaft 25, rotor body 17 and the bearing bore 33 are concentric or co-axial with stator bore 9 such that an air gap AG of substantially uniform thickness is provided between the outer surface of rotor body 17 received within stator bore 9 and the portions of core 5 which define stator bore 9.

With the exception of end flanges 37 being initially spaced from core side 11, unit bearing motor 1, as thus far described, is substantially similar to the unit bearing motor disclosed in the co-assigned U.S. Pat. No. 4,209,722, which is herein incorporated by reference. For a further description of the configuration, assembly, and operation of unit bearing motor 1, reference may be had to the last-mentioned U.S. Pat. No. 4,209,722.

Generally, the air gap AG is determined by the difference between the inside diameter of stator bore 9 and the outside diameter of rotor body 17. Because stator bore 9 is formed by punching central openings in lamination 7 and by assembling the laminations, there must, of necessity, be a range of tolerances of the stator bore 9. Generally, a stator, within acceptable tolerance limits, will have a maximum stator bore diameter and a minimum acceptable stator bore diameter. Likewise, rotor body 17 will have a maximum permissible diameter and a minimum permissible diameter. It will thus be understood that when a rotor assembly having the maximum permissible stator diameter is assembled together with a corresponding rotor body having a minimum acceptable rotor body diameter, the air gap AG will be of a maximum predetermined thickness, while when a stator having a minimum acceptable stator diameter is assembled with a rotor body having a maximum rotor body diameter, the air gap AG will be a minimum predetermined thickness. Generally, such diameters of the stator bore and the rotor body may be readily checked during manufacture by simple "go, no-go" tooling gauges or the like. For example, a particular unit bearing motor, such as illustrated in FIG. 1, may have a minimum acceptable stator diameter bore of 1.747 inches (4.437 mm.), and a maximum rotor body diameter of 1.731 inches (4.44 mm.), such that the minimum acceptable air gap AG would be 0.008 inches. The maximum permissible air gap may be 0.011 inches.

In accordance with this invention, stator assembly 3, as generally shown in FIG. 3, has a rotor tool, as generally indicated at 43, inserted within stator bore 9. The rotor tool includes a rotor tool body 45 having an outer surface 47. As indicated at D, the outer diameter of tool body outer surface 47 may be 1.746±0.0002 inches so as to accommodate a minimum rotor bore, as noted above. Further, rotor tool body 45 has an inwardly extending counterbore 49 therewithin so as to at least in part receive bearing hub 29 of end shield 27. The rotor tool body 45 further has a central opening 51 therethrough which receives a central pin 53. The central pin includes a head 55, an intermediate body portion 57, and a bearing pin 59, which is snuggly received within bearing bore 33 of sleeve bearing 31 within bearing hub 29 of end shield 27. For example, bearing pin 59 may have an outer diameter of 0.250±0.001 inches, and be polished with a hardened, ground surface so as to have a locational clearance fit within bearing bore 33. Generally, locational clearance fits have sufficient tolerances so that the pin can be freely assembled or disassembled with respect to the bearing bore, but so that the pin has a snug fit within the bearing bore for accuracy of location of the pin with respect to the bearing bore. It will be appreciated that within the broader aspects of this invention, the tolerances of both the central bearing pin 59 and the diameter of rotor tool body 45 may vary from the desired locational clearance fits as above-described, and still be within the scope of the present invention. It is important that the tolerances be such so as to accurately locate rotor tool body 45 with respect to stator bore 9, and so as to locate the bearing bore 33 with respect to bearing pin 59 such that end shield 27 is generally coaxial with respect to stator bore 9 such that when the rotor is installed, the stator, the rotor, and the end shield are substantially coaxial.

Further, referring to rotor tool 43, the intermediate body portion 57 of central pin 53 has a press fit into the central opening 51 in rotor tool body 45 so as to permit removal of both the rotor tool body 45 and central pin 53 as a unit. For convenience, a handle 61 (shown in phantom) may be secured to head 55 of central pin 53 as by a set screw or the like (not shown) so as to permit an operator to readily manually insert and remove rotor tool 43 from within bearing bore 33 and stator bore 9 of the end shield and stator, respectively.

As indicated generally at 63, a magnetic pulse-forming coil is shown to be located on the exterior of the end flanges 37 of end shield 27. As those skilled in the art with the technique of magnetic pulse-forming will appreciate, coil 63 may be connected in a magnetic pulse circuit which typically includes an energy storage capacitor, a circuit inductance coil 63, and the circuit includes resistance. A charging circuit is provided to charge up the energy storage capacitor. Upon momentarily connecting the storage capacitor to forming coil 63, a very high but instantaneous current is produced within the forming circuit upon the discharge of the capacitor thereby to produce a magnetic field. The actual coil may include field shaper pieces and the like (not shown), such that when the capacitor is discharged, compressive forces in the desired direction and of the desired magnitude can be substantially instantaneously and uniformly applied to the end flanges 37 of end shield 27. Generally, the energy dissipated by forming coil 63 is expressed in terms of kilojoules. It will be appreciated that the energy required to deform end shield flanges 37 of the motor 1 of the present invention may vary considerably, depending on the size of the motor and other conditions. However, for a motor having a stator bore of approximately 1.75 inches and an outside stator diameter of approximately 3.5 inches, an energy input ranging between about 6-12 kilojoules, and more preferably ranging between about 8 and about 10 kilojoules, may be required so as to generate a collapsing force F of sufficient magnitude to uniformly deform end shield flanges 37 inwardly on the outer surface 11 of core 5 in such manner as to positively lock end shield 27 in place on core 5.

It will be appreciated that the collapsing force F is substantially uniform around the entire periphery of end shield flange 37 and thus, the collapsing force F applies a radially inwardly directed force on core 5. Since rotor tool body 45 has a closer tolerance, sliding fit within stator bore 9, at least a portion of the inwardly directing collapsing force F is transferred to rotor tool body 45. Further, since central pin 53 is rigidly connected to rotor tool body 45 by the press fit of intermediate pin body portion 57 within central opening 51 of rotor tool body 45, there is a tendency of central pin 53 to exert a centering force on bearing hub 29 of end shield 27 such that the bearing hub of the end shield is maintained in concentric relationship with end shield flanges 37 and with stator bore 9 as the end shield flanges 37 are deformed inwardly on the outer surface 11 of stator core 5. In this manner, bearing hub 29 of end shield 27 is self-aligned with stator bore 9 during forming of the end shield on the stator core 5, and a high degree of concentricity between stator bore 9 and bearing bore 33 is achieved.

After magnetically forming end flanges 37 on core 5, as above-described, an operator may readily grasp handle 61 and remove rotor tool 43 both from stator bore 9 and from bearing bore 33. For further assembly of the motor, rotor assembly 15 is inserted within the stator and one end of rotor shaft 25 is received within bearing bore 33 of the end shield. The motor may then be assembled generally in accordance with the disclosure of the above-noted U.S. Pat. No. 4,209,722. For the sake of brevity, a detailed description of the other parts of unit bearing motor 1 and the assembly of the motor are herein omitted.

Referring to FIG. 3, a portion of another embodiment of dynamoelectric machine 1 of the present invention is indicated by reference character 1'. This other embodiment of the present invention is essentially identical to the motor and method of assembly, as heretofore described in regard to FIGS. 1 and 2, except in instances as will be hereinafter set forth in detail. For that reason, corresponding parts having a corresponding function to the parts heretofore described in regard to FIGS. 1 and 2, are indicated as "primed" reference characters, and thus a detailed description of the construction and function of these corresponding elements will not be set forth in detail.

Motor 1', except for the provision of a groove G which is formed in outer surface 11' of stator core 5', is essentially the same as motor 1. Upon magnetically forming the flange portion 37' of end shield 27' into firm abutting relation with the outer surface 11' of core 5', a portion of the end flange 37', as indicated at 101, is caused by the high magnetic forming forces applied thereto to flow into groove G thereby to positively interlock end shield 27' with stator core 5'. This positive interlocking feature tends to positively secure the end shield to the stator core, even at elevated temperatures, without the necessity of adhesives or the like.

Referring now to FIG. 4, a histogram of air gap distribution of both prior art motors (as shown in the solid bar graph lines of FIG. 4), and motors 1 in accordance with the present invention (as shown by the cross hatch bar graphs) are shown. In FIG. 4, the air gap of approximately 202 prior art or standard production unit bearing motors were measured. These prior art motors were made by machining the stator to fit in the end shield with the stator being concentric with the bearing bore. The end shield was then pressed into place. As shown in FIG. 4, air gaps as small as 0.003 inches were measured with the prior art production techniques, while air gaps up to 0.013 inches were measured. Generally, unduly small air gaps are undesirable because the rotor is more likely to strike the core, thus resulting in a "rotor strike" failure. Excessively large air gaps are undesirable because the efficiency of the motor tends to decrease.

In comparison, 189 motors of a similar size were assembled in accordance with the present invention and were similarily checked. Here, all of the air gaps were found to be between 0.006 and 0.010 inches, with 49.2 percent of the motors made in accordance with the present invention having a desired air gap of 0.008 inches. This histogram shows conclusively that the motors formed in accordance with the present invention have a more uniform and predictable air gap which in turn leads to less motor failures and to more efficient operation.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

What is claimed is:

1. The method of assembling a dynamoelectric machine, the latter comprising a stator including a core constituted by a stack of laminations of suitable ferromagnetic material, said core having an outer surface and a central bore extending longitudinally therethrough, a rotor including a rotor body and a shaft coaxial with respect to said rotor body and extending out beyond said rotor body, the latter being sized to fit closely within said bore but to be freely rotatable within said bore with a substantially uniform air gap of predetermined width between the inner surfaces of said core defining said bore and said rotor body, said bore having a minimum predetermined diameter, and at least one bearing support having bearing means therein for receiving and journaling said rotor shaft, said bearing means having a bearing bore, said bearing support being engagable with said core such that said bore, said rotor body, said rotor shaft, and said bearing bore are substantially coaxial, wherein the method comprises the steps of:

inserting a rotor tool into said stator bore, said rotor tool having a tool body with an outer diameter substantially equal to or slightly less than said minimum predetermined diameter of said bore, said tool further having a central pin;

inserting said central pin of said rotor tool into said bearing bore of said bearing support, the latter having portions thereof disposed on the outside of said outer core surface; and with said tool body received in said stator bore and with said central pin received in said bearing bore of said bearing support, magnetically deforming said portions of said bearing support inwardly onto said outer core surface for securement of said bearing support to said core such that said bearing bore and said stator bore are substantially coaxial.

2. The method of claim 1 further comprising removing said rotor tool from said stator bore and from said bearing bore and installing said rotor assembly in place thereof so that with said rotor shaft received in said bearing bore and with said rotor body received in said stator bore, said rotor body is substantially concentric with said stator bore with said substantially uniform air gap between said rotor body and said core.

3. The method of claim 1 wherein, upon magnetically deforming said portions of said bearing support, said rotor tool transfers compressive loading therethrough which is applied to said tool body by said stator core, and which aligns said bearing bore of said bearing support with respect to said central pin such that said stator bore and said bearing bore are substantially coaxial.

4. The method of claim 1 wherein said outer surface of said core has a groove therein, said method further comprising the step, upon magnetically deforming said portions of said bearing support, causing portions of said bearing support to flow into said groove thereby to mechanically interlock said bearing support to said core.

5. Apparatus for assembling a dynamoelectric machine, the latter having a stator comprising a core made up of a plurality of laminations of ferromagnetic material having an outer surface and a stator bore therethrough, a said stator bore having a minimum diameter a rotor assembly comprising a rotor body and a rotor shaft affixed to said rotor body and extending endwise therefrom, a bearing support having a bearing bore and portions disposed proximate said outer surface of said core, said rotor body and said rotor shaft being coaxial with said bearing bore for receiving said rotor shaft thereby to journal said rotor assembly with said rotor body being disposed within said stator bore with a substantially uniform air gap between said rotor body and the portions of said core defining said stator bore, said apparatus comprising a rotor body tool having an outside diameter substantially equal to or slightly less than said minimum inner diameter of said stator bore, said rotor tool body being positioned within said stator bore, a pin, extending from and coaxial with said rotor body tool and received within said bearing bore for substantially centering said rotor body tool and said stator bore with respect to said bearing support, and means for magnetically forming said portions of said bearing support onto said outer surface of said stator core with said rotor tool in place within said stator bore and with said central pin being received within said bearing bore such that after forming said bearing support and said stator core with said rotor assembly received within said stator bore and within said bearing bore, a substantially uniform air gap of predetermined thickness is present between said rotor body and the portions of said core defining said stator bore.

6. Apparatus as set forth in claim 5 wherein said core has a groove on the outer surface thereof, and wherein said portions of said bearing support magnetically deformed onto said core mechanically interlock with said groove thereby to aid in securing said bearing support to said core.

* * * * *